United States Patent
Sandini et al.

(10) Patent No.: US 9,233,473 B2
(45) Date of Patent: Jan. 12, 2016

(54) TACTILE SENSOR ARRANGEMENT AND CORRESPONDING SENSORY SYSTEM

(75) Inventors: Giulio Sandini, Genova (IT); Marco Maggiali, Lavagna (IT); Giorgio Cannata, Genova (IT); Giorgio Metta, Genova (IT)

(73) Assignees: FONDAZIONE ISTITUTO ITALIANO DI TECNOLOGIA, Genoa (IT); UNIVERSITA' DEGLI STUDI DI GENOVA, Genoa (IT)

(*) Notice: Subject to any disclaimer, the term of this patent is extended or adjusted under 35 U.S.C. 154(b) by 1092 days.

(21) Appl. No.: 12/741,577

(22) PCT Filed: Nov. 3, 2008

(86) PCT No.: PCT/IB2008/054553
§ 371 (c)(1),
(2), (4) Date: May 5, 2010

(87) PCT Pub. No.: WO2009/060366
PCT Pub. Date: May 14, 2009

(65) Prior Publication Data
US 2010/0234997 A1    Sep. 16, 2010

(30) Foreign Application Priority Data
Nov. 5, 2007  (IT) .............................. TO2007A0779

(51) Int. Cl.
*B25J 13/08* (2006.01)
*G01L 5/22* (2006.01)

(52) U.S. Cl.
CPC ............... *B25J 13/084* (2013.01); *G01L 5/228* (2013.01)

(58) Field of Classification Search
USPC .......... 901/46; 73/862.041, 862.046, 862.626
See application file for complete search history.

(56) References Cited

U.S. PATENT DOCUMENTS 4,641,251 A * 2/1987 Inoue .............................. 700/52
4,908,574 A * 3/1990 Rhoades et al. .............. 324/675
(Continued)

FOREIGN PATENT DOCUMENTS

JP    2002352370    12/2002
JP    2006287520    10/2006

OTHER PUBLICATIONS

Göger, Dirk, et al, "Sensitive Skin for a Humanoid Robot," *Conference on Human-Centered Robotic Systems* [online], retrieved from www.sfb588.uni-karlsruhe.de/publikationen/2006/R4_Goger_HCRS06.pdf>, XP002523126, (2006).
(Continued)

*Primary Examiner* — Peter Macchiarolo
*Assistant Examiner* — Alexander Mercado
(74) *Attorney, Agent, or Firm* — Kilpatrick Townsend & Stockton LLP

(57) ABSTRACT

A sensory system for a robot comprises a plurality of tactile sensor arrangements (10), each of which includes a flexible planar substrate (12) adapted to form the coating of a robot body, carrying a plurality of pressure sensing devices (14), and an associated signal acquisition microcircuit (16), so arranged as to acquire electrical signals indicative of the contact with an external object (O) or environment from the plurality of sensing devices (14). The microcircuit (16) faces a serial communication bus (B) shared by a plurality of associated arrangements, so as to provide the signals acquired by the plurality of arrangements to an external microcontroller processing unit (40). The sensor arrangement comprises a single input connection port (18') of the communication bus, and at least one output connection port (18') of the communication bus, adapted to define a branched path of the bus (B) through said plurality of associated arrangements.

16 Claims, 2 Drawing Sheets

(56) References Cited

U.S. PATENT DOCUMENTS

| | | | | |
|---|---|---|---|---|
| 5,010,774 | A * | 4/1991 | Kikuo et al. | 73/862.046 |
| 5,604,314 | A * | 2/1997 | Grahn | 73/628 |
| 5,684,324 | A * | 11/1997 | Bernstein | 257/415 |
| 5,799,533 | A * | 9/1998 | Seki et al. | 73/172 |
| 6,585,653 | B2 * | 7/2003 | Miller | 600/459 |
| 7,322,244 | B2 * | 1/2008 | Kim | 73/587 |
| 7,516,671 | B2 * | 4/2009 | Liu et al. | 73/756 |
| 8,127,623 | B2 * | 3/2012 | Son et al. | 73/862.046 |
| 2005/0094490 | A1 * | 5/2005 | Thomenius et al. | 367/155 |
| 2005/0096546 | A1 * | 5/2005 | Hazard et al. | 600/447 |
| 2006/0254369 | A1 * | 11/2006 | Yoon et al. | 73/862.041 |
| 2006/0267140 | A1 * | 11/2006 | Lee et al. | 257/532 |
| 2007/0012112 | A1 * | 1/2007 | Kim | 73/594 |
| 2008/0089383 | A1 * | 4/2008 | Liu et al. | 374/44 |
| 2008/0237002 | A1 * | 10/2008 | Zhang | 200/61.42 |
| 2010/0049450 | A1 * | 2/2010 | Nagakubo et al. | 702/41 |
| 2010/0050784 | A1 * | 3/2010 | Joung | 73/862.046 |
| 2010/0077868 | A1 * | 4/2010 | Joung | 73/862.046 |
| 2010/0224010 | A1 * | 9/2010 | Yang et al. | 73/862.046 |
| 2010/0288635 | A1 * | 11/2010 | Komiya et al. | 204/406 |
| 2010/0302199 | A1 * | 12/2010 | Taylor et al. | 345/174 |
| 2011/0005325 | A1 * | 1/2011 | Yang et al. | 73/724 |
| 2011/0036181 | A1 * | 2/2011 | Fritzsche et al. | 73/862.046 |
| 2011/0050256 | A1 * | 3/2011 | Frangen | 324/681 |
| 2011/0067504 | A1 * | 3/2011 | Koyama et al. | 73/862.381 |
| 2011/0226069 | A1 * | 9/2011 | Kim et al. | 73/862.045 |
| 2011/0252896 | A1 * | 10/2011 | Kishida et al. | 73/862.621 |
| 2011/0278078 | A1 * | 11/2011 | Schediwy et al. | 178/18.06 |
| 2012/0144932 | A1 * | 6/2012 | Ikebe et al. | 73/862.041 |
| 2012/0198945 | A1 * | 8/2012 | Yoneyama | 73/862.042 |
| 2012/0247226 | A1 * | 10/2012 | Muroyama et al. | 73/862.046 |
| 2012/0323501 | A1 * | 12/2012 | Sarrafzadeh et al. | 702/41 |
| 2013/0186208 | A1 * | 7/2013 | Lee et al. | 73/862.046 |

OTHER PUBLICATIONS

Hoshi, Takayuki, et al., "Robot Skin Based on Touch-Area-Sensitive Tactile Element," *Proceedings of the IEEE International Conference on Robotics and Automation*, pp. 3463-3468, (2006).

Kerpa, Oliver, et al, "Development of a Flexible Tactile Sensor System for a Humanoid Robot," *Proceedings of the 2003 IEEE/RSJ International Conference on Intelligent Robots and Systems*, vol. 1, pp. 1-6, XP010672307, (2003).

Ohmura, Yoshiyuki, et al., "Conformable and Scalable Tactile Sensor Skin for Curved Surfaces," *Proceedings of the IEEE International Conference on Robotics and Automation*, pp. 1348-1353, XP010921458, (2006).

Tajika, Taichi et al, "Automatic Categorization of Haptic Interactions—What Are the Typical Haptic Interactions Between a Human and a Robot?" *6th IEEE-RAS International Conference on Humanoid Robots*, pp. 490-496, XP031053066, (2006).

* cited by examiner

TACTILE SENSOR ARRANGEMENT AND CORRESPONDING SENSORY SYSTEM

CROSS REFERENCES TO RELATED APPLICATIONS

This application is a U.S. National Phase Application under 35 U.S.C. §371 of International Application No. PCT/IB2008/054553, filed on Nov. 3, 2008, which claims the benefit of Italian Application No. TO2007 A000779, filed on Nov. 5, 2007, which is herein incorporated by reference for all purposes.

FIELD OF THE INVENTION

The present invention relates to an arrangement of tactile sensors as defined in the preamble of claim 1.

BACKGROUND

"Skin-like" tactile sensors are known for applications in the field of humanoid robotics, where they are applied on the rigid outer part of a robot body (shell) to provide information about the contact between robot and environment. Particularly, such sensors allow detecting the pressure exerted by an object, the environment, or a human being, on the coated areas of the robot, and allow defining the shape of an object contacting the same robot.

Sensor arrangements having suitable geometrical structures can be also applied on curved surfaces of a robot shell, thus fitting thereto, leaving not covered only a minimum part of the robot, essentially the articulation joints.

It is of course desirable to have a large high-resolution "sensitive" surface, which can be obtained by providing a sensor arrangement as much drawn closer as possible, without unduly increasing the relative electronic control complexity.

JP 2006-287520 discloses a communication network for artificial skin, based on the connection of modular patches, each comprising at least one tactile sensor, and a microcontroller unit, so as to obtain a logic network of sensors capable of sending the tactile information acquired from any node to a central processor controlling the robot. Each node is physically connected to at least another node and at most four nodes. At a physical level, the network is completely connected. At a logic level, the techniques employed in the field of processor networks (Dynamic Source Routing Protocol) are used in order to reconstruct network topology.

Advantageously, innumerable patches can be connected one another without paying attention to the network topology, which will be recreated subsequently.

However, this solution has the drawback that each patch is very complex from the point of view of the required electronic components, therefore the relative cost is high, and the energy consumption is not negligible. Furthermore, many connections between the various nodes have to be physically implemented, and this makes data routing particularly complex.

JP 2002-352370 discloses the implementation of a "strip" of tactile sensors arranged on a film, adapted to the wireless transmission of the pressure data detected. In this case, there are not patch structures comprising more sensors, but all the sensors are mutually connected so as to be able to be supplied, via the supply tracks existing on the film. Instead, communication takes place via radio.

Disadvantageously, the environment surrounding the robot is typically very noisy, due to the electromagnetic interferences originating from the robot motors, and this makes radio communication of information difficult, where the number of the pieces of information is high, while the available radio band is reduced.

The article by T. Hoshi and H. Shinoda, "Robot Skin Base on Touch-Area-Sensitive Tac-tile Element," published in "Proceedings of the 2006 IEEE International Conference on Robotics and Automation", Orlando, Fla., May 2006, discloses a tactile sensor system in which the sensitive element is used as a transducer and communication means. Each sensor element is connected to the other sensor elements through a communication micro-circuit, the role of which is to condition the measurement signal coming from the tactile element and send it to an external processor. Each tactile element is used both as a transducer and as an electrical connection between the various communication microcircuits, which promotes the signal routing. Disadvantageously, the implementation of this structure is particularly complex (in fact, it is necessary to manage the commutation between detecting condition and data transmission condition) and the spatial resolution is quite reduced.

The article by Y. Ohmura, Y. Kuniyoshi, and A. Nagakubo "Comformable and Scalable Tactile Sensor Skin for Curved Surfaces," published in "Proceedings of the 2006 IEEE International Conference on Robotics and Automation", Orlando, Fla., May 2006, discloses an optical tactile sensor formed by LED-photodetector pairs implemented on a flexible substrate, which are adapted to detect the variation in refraction of light emitted by the LED as a function of the mechanical deformation experienced by the sensor contact layer.

More sensor elements are obtained on flexible printed circuit sheets, and the arrangement thereof has a particular geometry capable of coating three-dimensional, thus curved, surfaces. On the whole, each sheet is of a rectangular shape, and having a dimension of 120×200 mm, on which 32 sensor elements are arranged. The sheets can be freely folded and cut, and connected one to the other. Each sheet is provided with a microcontroller which is adapted to manage the measurement data acquisition from the sensor elements, and respective contact terminals for the connection between contiguous sheets are present at the end edges.

From the point of view of the circuit architecture, each sheet is adapted to collect 32 8-bit pressure data. The various sheets are mutually connected via a serial communication bus which is controlled by a master microcontroller arranged on an electronic board managing the assignation to the various sheets in order to sequentially collect all the detected data. In turn, the master microcontrollers are connected one to the other, and to a central processor which controls the robot via a LIN network.

Each contact terminal of the individual sheets can be considered as a data input or output port, with the drawback of being able to constitute, with the serial communication bus, transmission loops which cause electrical reflections on the bus, which are aggravated by the fact that the bus does not have a termination, leading to the bus performance degradation.

Although the use of a flexible printed circuit as a substrate reduces the problem of the data routing, thanks to the fact that the connections are implemented via the same substrate, the spatial resolution which can be achieved is quite low, it being impossible to increase the achieved density of 32 sensors in an area of 120×200 mm according to the proposed architecture, due to the large dimensions of the constituent components of the sensor, the increase of electrical connections which would be required therebetween and, not last, the high need for power supply.

Furthermore, the particular technological implementation of the sensor elements does not allow a simultaneous reading of the measurement data of the same, since the microcontroller sequentially performs the data collection from the various sheets, in order to limit the energy consumption for the device. This makes so that it is impossible to get an average measurement of the data coming from the sensors, but with a post-processing of the same data.

Therefore, the aim of the present invention is to provide a satisfactory solution to the problems set forth above, thus avoiding the drawbacks of the prior art.

Particularly, the aim of the present invention is to provide an arrangement of tactile sensors which is applicable to arbitrarily curved extended surfaces, with sensing devices (transducers) having reduced dimensions, in order to achieve a high resolution, which minimizes at the most the electronic control architecture overall dimensions in the installation on robots and the energy consumption.

A further object is to provide an arrangement of tactile sensors which has a wide range of sensitivity for the detection of both light and heavy contacts, that is, equal to the total body weight of the robot, as well as which is resistant against impacts and shear forces which the robot body can experience.

According to the present invention, such object is achieved thanks to an arrangement of tactile sensors having the characteristics set forth in claim 1.

Particular embodiments are the subject of the dependant claims.

SUMMARY

In summary, the present invention is based on the principle of using sensor modules comprising arrangements of sensors on flexible substrates having a triangular area, which have the property of easily conforming to curved surfaces. Each sensor arrangement comprises a plurality of pressure sensing devices/transducers for the detection of a contact with an external object or environment, and an associated microcircuit which is adapted to process a corresponding plurality of analogical measurement signals generated by the sensing devices/transducers and indicative of the presence, absence, and intensity of the contact with the external object or environment.

A serial bus connects each microcircuit to a microcontroller circuit arranged on board of a master board which can be arranged inside the part of the robot to be coated.

A complete sensory system comprises a plurality of microcontroller circuits, each being adapted to connect to a plurality of associated modular arrangements of sensors in order to acquire the contact measurements. The microcontroller circuits are connected in a network one to the other and to a central processor via a CAN communication bus, in order to allow the collection of all the acquired measurements, and the processing thereof to recognize the environment surrounding the robot.

BRIEF DESCRIPTION OF THE DRAWINGS

Further characteristics and the advantages of the invention will be set forth in more detail in the following detailed description of an embodiment thereof, given by way of non-limiting example, with reference to the annexed drawings, in which.

DETAILED DESCRIPTION

Figure 1:
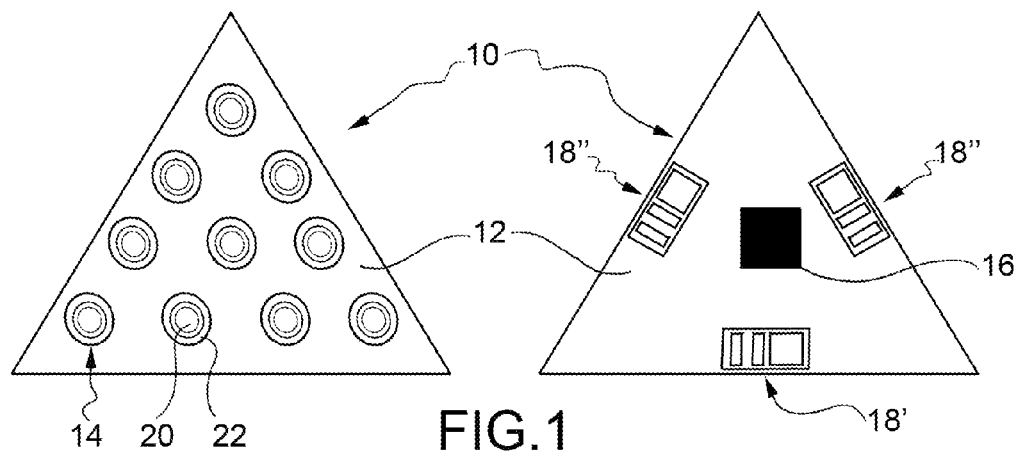
FIG. 1 is a representation of a sensor module which is the subject of the invention.
Figure 2:
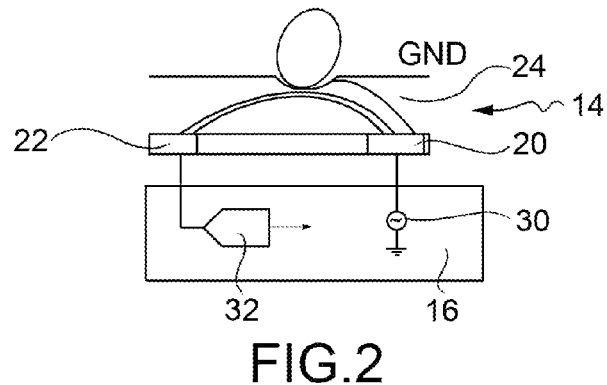
FIG. 2 is a schematic representation of an individual sensor device of the module in FIG. 1.

A modular arrangement of tactile sensors 10 which is the subject of the invention is shown in FIG. 1.

It comprises a planar substrate in the form of a flexible circuit board 12, carrying a plurality of tactile sensing devices (transducers) 14 arranged on a first surface, and signal acquisition and conditioning electronics arranged on the opposite surface, and including a microcircuit 16 and a set of input/output ports.

More specifically, the set of ports 18 comprises an input connection terminal port 18' and at least one output connection terminal port 18", all the ports being arranged in the proximity of the substrate edges intended to be flanked by other similar modules. Each port includes a plurality of contact conductive pads so dimensioned as to connect one to the other, and to the microcircuit 16, a supply line (supply and ground voltage), a clock line and a data communication serial bus B (I2C or SPI), comprising 4 parallel communication channels in the preferred embodiment.

The microcircuit is, for example, an AD7142 chip by the Analog Devices.

In the representation of the Figure, the sensor arrangement has a triangular shape by way of example, which is currently preferred thanks to the fact of being easily conformable by folding it around a number of axes, and the sensing devices are arranged mutually equally spaced.

Each sensor device is of a known capacitive type, and comprises a circular electrode 20 and a concentric annular electrode 22, between which an electric field is established, which is confined in a layer 24 of a soft dielectric coating material, in turn coated by a conductive tissue connected to ground, acting as a ground plane.

The microcircuit 16 comprises means 30 for generating a sensor excitation signal, for example, a square wave voltage signal at 250 KHz frequency, applied to the circular electrodes 20 of the sensing devices, and an analog-digital converter circuit 32 adapted to acquire the voltage signals which are established at the annular electrodes 22, and to provide data of contact analogical (capacitive) measurements on the communication bus B.

During functioning, when an object O presses on a sensor device, this causes the decrease of the distance from ground plane to electrodes 20 and 22, thus modifying the flux lines of the electric field between the electrodes, thereby increasing the nominal capacity value of the sensor.

With the provision of 12 sensing devices for each module, the microcircuit is adapted to provide 16-bit data indicative of 12 capacity measurements.

A complete sensory system according to the invention is formed by the connection of a plurality of modular arrangements of sensors of the type described above, not necessarily having the same dimensions, flanked and put side by side at the sides thereof, so as to have, in a facing relationship, respective input and output connection terminal ports 18', 18". A system which has been implemented in this manner is illustrated in FIG. 3.

Figure 4:
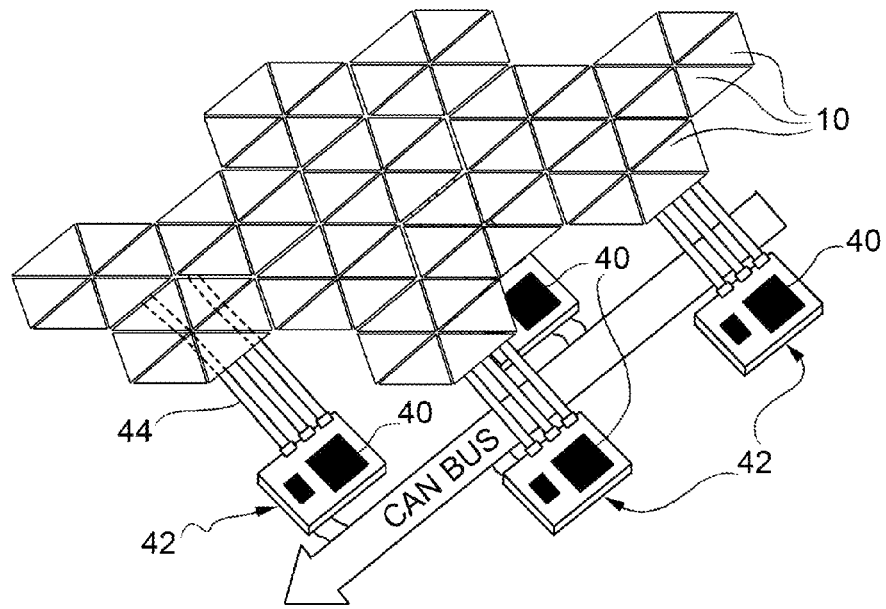
FIG. 4 is a schematic representation of the control architecture of a sensory system comprising a plurality of sensor modules according to the invention.
Figure 3:
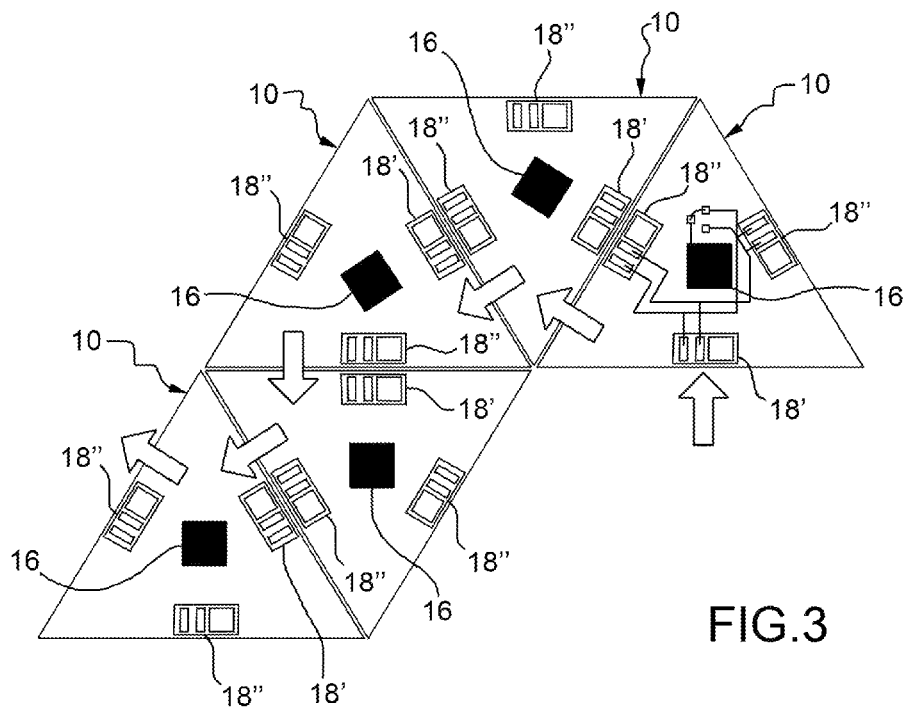
FIG. 3 is a representation of a set of sensor modules which are coupled according to the invention.
Figure 5:
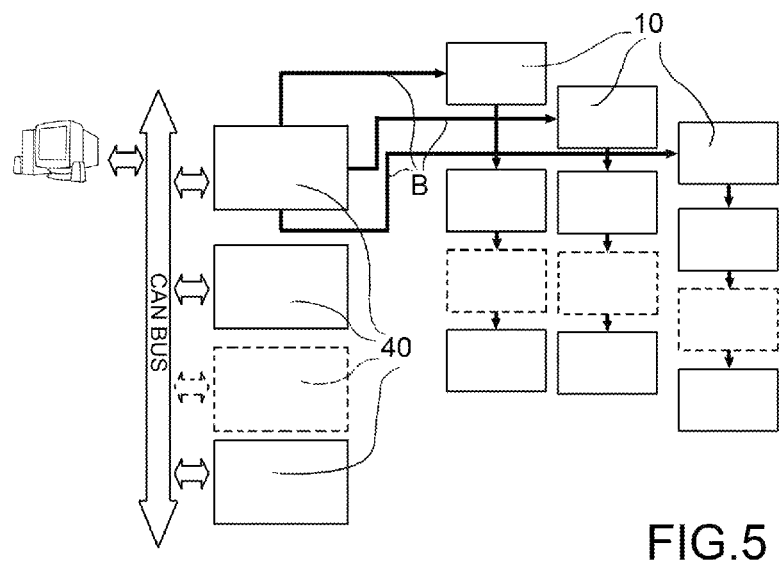
FIG. 5 is a circuit block diagram of the sensory system control architecture in FIG. 4.

With reference to the FIGS. 3, 4, and 5, a control architecture of the sensory system of FIG. 3 is shown.

A plurality of microcontroller circuits 40 is provided, each of which is housed on board of a respective master circuit board 42 of the conventional printed circuit board type, which is installable within the robot part to be coated, and connected to a set of microcircuits 16 (for example, in a number of 16, so that each microcontroller is adapted to simultaneously acquire 196 measurements) via a cable 44 (for example, a so-called flat-cable) including the supply and clock lines, and the serial communication bus B, and relative communication paths between input and output ports of the sensor modules.

Each microcontroller circuit serves the function of programming the individual sensor modular arrangements associated therewith, reading the measurements acquired by them, and sending such measurements to a processing unit, possibly after a local pre-processing of data, for example, for a compression thereof.

The microcontroller circuits 40 are connected in a network to a central processor via a CAN communication bus which they face through respective transceiver modules, in order to allow the collection of all the detected data and the complete processing thereof.

Advantageously, the individual sensor arrangement modules, represented herein by way of example only as having a triangular shape and equal dimensions, are implemented on a flexible printed circuit previously connected one to the other, so that a sheet containing the above-mentioned modules is able to be wrapped on the shell portion of a robot to be covered after performing a simple sheet configuration operation by cutting and removal of the excess modules. The same cutting operation can be promoted by a die cutting provided at the edges of adjacent modules, where an electrical connection is not established.

The size of the triangular modules can be varied during manufacturing, as a function of the curvature of the surfaces which are intended to be coated, and the resolution which it is intended to be obtained. In practice, it is possible to design the coating of a specified curved surface by calculating the relative grid of triangles by applying a triangulation method, then laying the so-calculated grid of triangles on a planar surface, and to design the relative signal routing layout between adjacent modules, assigning an input communication port and a plurality of output communication ports to each module. The dimensions which can be obtained by means of the current technologies range between a minimum of 20 mm and a maximum of 100 mm for each side.

It is possible to change and adapt the dimensions of the sensor arrangements, therefore the resolution thereof, via software, that is, logically and not physically, simply by calculating average pressure measurements from sensing devices belonging to different parts of modules or sets of modules.

Advantageously, the sensor arrangement which is the subject of the invention allows employing two different ways of reading pressure conditions through the microcircuit 16, in order to separately and sequentially read the individual measurements coming from all the sensing devices (in an overall period of time of about 18 ms, with 12 sensing devices), or in order to determine an overall measurement related to the sum of all the measurement signals of the sensing devices (which is possible in a much shorter period of time, of the order of 1.5 ms), respectively.

In this manner, it is possible to create a sensitive coating for a robot, which allows providing very quickly a first piece of information about a contact, even if with a lower spatial resolution, and successively, when a contact area has been individuated, increasing the spatial resolution only in such area, losing temporal resolution, simply by switching the reading functioning mode of the microcircuit 16.

A further advantage of the solution which is the subject of the invention is the reduced energy consumption of each sensor arrangement (of the order of about 1 mA), and the micro-controllers (ranging between 10 and 50 mA). Differently from other known solutions, which use a microcontroller for each sensitive element, thereby providing for an average absorption of about 10 mA per measurement, thanks to the proposed solution the average absorption is suitably reduced to a value of about 0.1 mA per measurement.

Furthermore, the sensor arrangement according to the invention makes it possible to configure the overall sensor system topology afterwards, by using connections between communication bus lines and microcircuits via strips for the selection of the communication bus and the relative datum address of each sensor module. In fact, the assignation of an address to a sensor module occurs by connecting predetermined microcircuit terminals to ground or to the supply voltage. This connection could be adapted afterwards in an automated manner, for example, by welding a small connecting bridge or similar contact, thus avoiding having to design special sheets for each part of a robot to be coated.

It shall be apparent that, on the understanding of the principle of the invention, the embodiments and the embodiment details will be able to be widely varied relative to what has been described and illustrated by way of non-limiting example only, without for this departing from the scope of protection defined by the annexed claims.

The invention claimed is:

1. A tactile sensor module, comprising:
    a flexible planar substrate having (i) outer edges defining an area of a shape, (ii) a first surface having the area of the shape, and (iii) a second surface having the area of the shape and positioned on an opposite side of the flexible planar substrate from the first surface, the flexible planar substrate configured to form a coating of a curved surface along with other flexible planar substrates of like tactile sensor modules so that the coating comprises a plurality of tactile sensor modules;
    a plurality of pressure sensing devices carried by the flexible planar substrate and arranged on the first surface completely within the area of the shape;
    signal acquisition components, comprising a microcircuit arranged on the second surface of the flexible planar substrate and arranged completely within the area of the shape, the microcircuit configured to acquire electrical signals indicative of a contact with an external object or environment from said plurality of pressure sensing devices;
    a single input connection port arranged on the flexible planar substrate; and
    a plurality of output connection ports arranged on the flexible planar substrate;
    wherein the plurality of output connection ports and the single input connection port are configured to define a branched path of a serial communication bus through said plurality of tactile sensor modules; and
    wherein said signal acquisition components face the serial communication bus so as to provide the electrical signals acquired by said microcircuit to an external microcontroller processing unit.

2. The tactile sensor module according to claim 1, wherein each of said pressure sensing devices comprises an arrangement of facing electrodes, between which an electric field is established, which is modified upon contact with an external object due to a consequent deformation of said arrangement of facing electrodes.

3. The tactile sensor module according to claim 2, wherein said microcircuit includes electric field excitation components, configured to provide an excitation electric signal to an electrode of each pressure sensing device, and reading components of a corresponding voltage signal related to the electric field distribution induced by the excitation signal and modified by the deformation of the arrangement of facing electrodes, said reading components including an analog-digital converter circuit configured to provide data of contact measurements.

4. The tactile sensor module according to claim 1, wherein the area of the shape defined by the outer edges of the flexible planar substrate is a triangular area.

5. The tactile sensor module according to claim 4, wherein the plurality of pressure sensing devices comprises three or more pressure sensing devices that are arranged equally spaced one relative to the other on said area.

6. The tactile sensor module according to claim 1, wherein said serial communication bus comprises a plurality of measurement data transmission channels, a supply line, and a temporization signal line.

7. The tactile sensor module according to claim 6, wherein the input connection port and the output connection ports comprise connection pads configured to route said measurement data transmission channels, said supply line, and said temporization signal line.

8. The tactile sensor module according to claim 3, wherein said microcircuit is configured to sequentially read the voltage signals acquired from each pressure sensing device.

9. The tactile sensor module according to claim 3, wherein said microcircuit is configured to determine an average measurement from the plurality of pressure sensing devices.

10. A sensory system for a robot, wherein the sensory system comprises at least a plurality of tactile sensor modules according to claim 1, connected to said microcontroller processing unit, said microcontroller processing unit facing a communication bus accessible by a central processor which controls the robot.

11. The tactile sensor module according to claim 1, wherein said input connection port and output connection ports are arranged in the proximity of the edges of the flexible planar substrate so that the input connection port is in a facing relationship with an output connection port of a flanked tactile sensor module, the input connection port and the output connection ports including a plurality of contact pads so as to connect one to the other and to the microcircuit.

12. The tactile sensor module of claim 1, wherein the single input connection port and the plurality of output connection ports are arranged at at least an outer edge of the flexible planar substrate.

13. The tactile sensor module of claim 12, wherein the single input connection port and each output connection port of the plurality of output connection ports is each arranged on the second surface.

14. The tactile sensor module of claim 12, wherein at least one outer edge of the flexible planar substrate is joined to an outer edge of another flexible planar substrate of another tactile sensor module of the plurality of tactile sensor modules by at least one of the single input connection port or at least one of the output connection ports of the plurality of output connection ports.

15. The tactile sensor module of claim 1, wherein the flexible planar substrate is separate or distinct from the other flexible planar substrates of the like tactile sensor modules.

16. A tactile sensor module, comprising:
a triangular flexible planar substrate having (i) outer edges defining a triangular area, (ii) a first surface having the triangular area, and (iii) a second surface having the triangular area and positioned on an opposite side of the triangular flexible planar substrate from the first surface, the triangular flexible planar substrate configured to form a coating of a curved surface along with other triangular flexible planar substrates of like tactile sensor modules so that the coating comprises a plurality of tactile sensor modules;
a plurality of pressure sensing devices carried by the triangular flexible planar substrate and arranged on the first surface completely within the triangular area;
signal acquisition components, comprising a microcircuit arranged on the second surface of the triangular flexible planar substrate and arranged completely within the triangular area, the microcircuit configured to acquire electrical signals indicative of a contact with an external object or environment from said plurality of pressure sensing devices;
a single input connection port arranged on the triangular flexible planar substrate; and
a plurality of output connection ports arranged on the triangular flexible planar substrate;
wherein the plurality of output connection ports and the single input connection port are configured to define a branched path of a serial communication bus through said plurality of tactile sensor modules; and
wherein said signal acquisition components face the serial communication bus so as to provide the electrical signals acquired by said microcircuit to an external microcontroller processing unit.

* * * * *